(12) United States Patent
Albert et al.

(10) Patent No.: US 6,821,482 B1
(45) Date of Patent: Nov. 23, 2004

(54) TRIGGERED ACTIVE PACKAGING MATERIAL

(75) Inventors: Candiera Faith Albert, Darlinghurst (AU); Michael Laurence Rooney, Lane Cove (AU)

(73) Assignee: Commonwealth Scientific and Industrial Research Organisation, Australian Capital Territory (AU)

(*) Notice: Subject to any disclaimer, the term of this patent is extended or adjusted under 35 U.S.C. 154(b) by 458 days.

(21) Appl. No.: 09/665,414

(22) Filed: Sep. 20, 2000

Related U.S. Application Data

(63) Continuation-in-part of application No. 08/945,527, filed as application No. PCT/AU96/00250 on Apr. 29, 1996, now Pat. No. 6,123,901.

(30) Foreign Application Priority Data

Apr. 28, 1995 (AU) .............................. PN 2672

(51) Int. Cl.⁷ ................................. B01J 19/00
(52) U.S. Cl. ..................... 422/40; 422/41; 428/327; 428/328
(58) Field of Search .............................. 428/327, 328; 422/40, 41

(56) References Cited

U.S. PATENT DOCUMENTS

| | | |
|---|---|---|
| 4,510,162 A | 4/1985 | Nezat |
| 4,898,734 A | 2/1990 | Mathiowitz et al. |
| 5,262,375 A | 11/1993 | McKedy |
| 5,286,407 A | 2/1994 | Inoue et al. |
| 5,366,881 A | 11/1994 | Singh et al. |

FOREIGN PATENT DOCUMENTS

| | | |
|---|---|---|
| EP | 0076515 | 4/1983 |
| JP | 55-28944 | 2/1980 |
| JP | 62125852 | 8/1987 |
| JP | 1-23967 | 1/1989 |
| JP | 02258584 | 3/1989 |
| JP | 01167079 | 6/1989 |
| JP | 02071814 | 3/1990 |
| JP | 05247463 | 3/1992 |
| JP | 04191039 | 9/1992 |
| JP | 6-255681 | 9/1994 |
| WO | 94/12590 | 6/1995 |

*Primary Examiner*—E. Leigh McKane
(74) *Attorney, Agent, or Firm*—McDermott, Will & Emery

(57) ABSTRACT

Oxygen scavenging can lining materials are disclosed. The oxygen scavenging materials comprise at least one compound oxidizable by molecular oxygen, wherein the at least one compound is contained within microcapsules which are rendered oxygen permeable by contact with aqueous can contents.

14 Claims, No Drawings

TRIGGERED ACTIVE PACKAGING MATERIAL

RELATED APPLICATIONS

This application claims priority from and is a continuation-in-part application of U.S. patent application Ser. No. 08/945,527, filed Jan. 6, 1998, now U.S. Pat. No. 6,123,901 which is incorporated herein by reference, which is a 371 of PCT/AU96/00250, filed Apr. 29, 1996.

This invention relates to methods and materials for reducing the oxygen concentration present in an atmosphere, solid, semi-solid or liquid (often referred to as oxygen scavenging).

A wide variety of foods and other materials are susceptible to loss in quality during storage under atmospheric levels of oxygen. The damage can arise from chemical oxidation of the product from microbial growth, and from attack by vermin—much of which may be avoided by reducing the oxygen availability in the environment of the materials. In the field of packaging, relatively low-oxygen atmospheres have traditionally been generated by vacuum packaging and inert gas flushing. However, chemical techniques for generating low-oxygen atmospheres and deoxygenating liquid or semi-liquid foods have also been proposed (see, for example U.S. Pat. No. 5,211,875 and our co-pending application No. PCT/AU93/00598 published as WO 94/12590). The disclosure of both of these patent specifications is to be considered as incorporated herein by reference.

The compositions and packaging materials described in WO 94/12590 may be activated to their oxygen scavenging form when it is most convenient or desirable. This means that activation may be carried out just prior to application and thereby avoids the necessity of storing the activated composition or packaging material in an inert atmosphere or vacuum. However, there are situations and applications where it would be preferred to activate the composition or packaging material at a site remote from where the composition/package is to be used.

Thus, in a first aspect the present invention provides an oxygen scavenging material comprising at least one compound oxidizable by molecular oxygen, wherein said at least one compound is contained within an oxygen impermeable compartment(s) or microcapsule(s) which may, as required, be broken or otherwise rendered oxygen permeable by application of heat, electromagnetic radiation, mechanical pressure or stress, or by hydration.

The at least one compound oxidizable by molecular oxygen may be any of those described in WO 94/12590. However, it is preferred that the at least one oxidizable compound is a compound produced from the photoreduction of an oxidized precursor compound and is oxidizable under conditions independent of both constant illumination and the presence of a transition metal catalyst. More preferably, the at least one oxidizable compound is selected from the group consisting of the reduced forms of quinones, such as benzoquinone, anthraquinone (e.g. 9,10-anthraquinone) and napthoquinone (e.g. 1,4-napthoquinone); photoreducible dyes (e.g. methylene blue); and carbonyl compounds which have absorbance in the UV spectrum, such as azo, thiazine, indigoid and triarylmethane compounds. However, iron powder and oxidisable MXD-6 nylon or 1,2-polybutadiene in the presence of a transition metal salt catalyst, may also be suitable.

Most preferably, the at least one oxidizable compound is a reduced form of a substituted anthraquinone such as 2-methylanthraquinone, 2-ethylanthraquinone and 2-amylanthraquinone.

In some applications of the invention, particularly food packaging, it is also preferred that the at least one oxidation compound be present in a polymerised or oligomerised form. The preparation of oxidized polymeric and oligomeric precursor compounds is described in WO 94/12590.

The at least one oxidizable compound may be used in substantially pure form, however, it is preferred that it be present as a component of a composition according to the invention described in WO 94/12590.

Where the at least one oxidizable compound is present as a component of a composition, the composition may further comprise an activated oxygen scavenging component reactive to activated oxygen species (e.g. peroxide) which may be generated during the scavenging of molecular oxygen. Preferred examples of the activated oxygen scavenging component include antioxidants such as alkylated phenols and bisphenols, alkylidene bis-, tris- and polyphenols, thio- and bis-, tris- and polyalkylated phenols, phenol condensation products, amines, sulfur-containing esters, organic phosphines, organic phosphites, organic phosphates, hydroquinone and substituted hydroquinones; inorganic compounds such as sulphates, sulfites, phosphites and nitrites of metals, particularly those of groups 1 and 2 of the periodic table and first row transition metals, zinc and tin; sulfur-containing compounds such as thiodipropionic acid and its esters and salts, thio-bis (ethylene glycol β-aminocrotonate), as well as the amino acids cysteine, cystine and methionine; and nitrogen-containing compounds capable of reacting with activated forms of oxygen include primary, secondary and tertiary amines and their derivatives including polymers.

Preferably, the activated oxygen scavenging component is selected from the group consisting of triphenylphospine, triethylphosphite, triisopropylphosphite, triphenylphosphite, tris(nonylphenyl)phosphite, tris(mixed mono- and bis-nonylphenyl)phosphite, butylated hydroxytoluene, butylated hydroxyanisole, tris(2,4-di-tert-butylphenyl)phosphite, dilaurylthiodipropionate, 2,2-methylene-bis-(6-t-butyl-p-cresol), tetrakis(2,4-d-tert-butylphenyl) 4,4'-biphenylene diphosphonine, poly(4-vinylpyridine) and mixtures thereof.

The activated oxygen scavenging component may also be present in a polymerised or oligomerised form.

Breakage of the compartment(s) or microcapsule(s) may be achieved by application of heat (e.g. melting of waxes or low melting point polymers such as polyethylene or ethylene vinyl acetate), electromagnetic radiation (e.g. UV light) or mechanical pressure or stress (e.g. crushing through rollers, and stirring). Alternatively, the compartment(s) or microcapsule(s) may be rendered oxygen permeable by hydration (e.g. by application of water or water vapour).

The at least one oxidizable compound or composition may be present in the oxygen scavenging material, for example, in the form of a layer within a multi-layer polymeric film. Additionally or alternatively, the at least one oxidizable compound or composition may be contained in compartment(s) or microcapsule(s) incorporated into a film material (e.g. a polymeric film material) where they may be broken by for example, crushing between rollers.

The compartment(s) may be constructed from film materials such as silica-coated films, and may include or consist of hydrophilic agents such as polyvinyl alcohol and gelatine, and cellulose esters and ethers. The polymers used may also be cross-linked and may include or consist of cross-linked proteins.

Microcapsules may be prepared from, for example, hydrophilic and/or brittle polymers. Preferred materials include polysaccharides, modified polysaccharides, and hydrophilic polymers such as polyvinyl alcohol and polyethyleneimmine. These materials may also be cross-linked or combined with proteins. Mixtures of these materials may also be used.

Methods for producing microcapsules are described in Agis F. Kydonieus, (Ed), Controlled Release Technologies: Methods, Theory and Applications, CRC Press Inc. Cleveland (1980). The preferred size range for microcapsules is 0.1 to 100 µm in diameter.

Where the at least one oxidizable compound is present as a component of a composition, it may also be preferred to include within the composition a source of labile hydrogen or electrons to assist photoreduction of a photoreducible precursor compound (i.e. to prepare an oxidizable compound).

The compartment(s) or microcapsule(s) may also be a source of electrons or hydrogen atoms for photoreduction of a photoreducible precursor compound. Alternatively, the compartment(s) or microcapsule(s) may merely serve as an oxygen barrier to protect the oxidizable compound from premature exposure and oxidation by molecular oxygen.

The oxygen scavenging material may be used independently or as components of blends. The material may take the form of a cross-linked polymeric matrix, as in a can lacquer, or be bonded to or absorbed onto an inorganic polymer such as silica. The material may be effectively applied as, or incorporated in, for example, bottle closure liners, PET bottles, liners for wine casks, inks, coatings, adhesives, films or sheets either alone or as laminations or coextrusions, or they may take the form, or be included in, pads, spots, patches, sachets, cards which may be attached to packaging materials or located independently within a package.

In a second aspect, the present invention provides a can lining (e.g. lacquer) composition comprising oxygen-impermeable microcapsules incorporated into a polymeric lining matrix, wherein said microcapsules contain an amount of at least one compound which is oxidizable by molecular oxygen and are comprised of a hydrophilic polymer such that they are rendered oxygen-permeable upon contact with aqueous can contents.

Such compositions when applied to at least a portion of the inner surfaces of a can, can be used to deoxygenate can contents and can headspaces during the canning process.

The polymeric lining matrix may be any of those well known in the art. In particular, the polymeric lining matrix may be a cross-linked matrix such as an epoxy, or may be a non-cross-linked matrix such as polypropylene, polyester or mixtures thereof. The polymeric lining matrix will typically by hydrophobic and thereby retain the incorporated microcapsules in a "dry" and oxygen-impermeable state (e.g. where oxygen transmission across the microcapsule wall is less than 100 cc 20 µm/m$^2$/24 hr/MPa at 50% RH). During canning, the heat and pressure of such processes will expose the microcapsules to moisture (primarily from the can contents) thus rendering the microcapsules oxygen-permeable and thereby initiating deoxygenation of the can contents and can headspaces.

The can lining composition according to the invention can be supplied directly to the can manufacturer or, otherwise, produced by the can manufacturer shortly before use.

In a third aspect, the present invention provides a can lined with a composition according to the second aspect.

In a fourth aspect, the present invention provides a method for lining a can, said method comprising applying a composition according to the second aspect to at least a portion of said can's inner surfaces.

As is evident from the disclosure of WO 94/12590, when the activated composition (ie., wherein the reducible compound has been reduced by predetermined conditions) according to the invention described therein, reacts with molecular oxygen, hydrogen peroxide is produced. By ensuring that the composition does not include significant amounts of an activated oxygen scavenging component, the so produced hydrogen peroxide may be released via the surface where its high antimicrobial activity may be utilised to cause sterilisation or otherwise reduce microbial populations.

In this embodiment the invention thereby reduces the potential for microbial growth by the combined effect of deoxygenation and sterilisation by hydrogen peroxide. This may be of particular commercial significance in the fibre-board carton industry where high microbial counts are found especially in recycled materials. The generation of taints from recycled fibre-board packaging materials due to microbial action might be substantially reduced in this way. Plastics packaging materials are also required to be sterilised or have their surface microbial population reduced in a wide variety of food packaging applications.

Thus, in a further aspect, the invention provides a material comprising at least one compound oxidizable by molecular oxygen contained within an oxygen impermeable compartment(s) or microcapsule(s) which may, as required, be broken or otherwise rendered oxygen permeable by application of heat, electromagnetic radiation, mechanical pressure or stress, or by hydration, wherein following oxidation of said compound by molecular oxygen, hydrogen peroxide is produced and liberated from said material in anti-microbial amounts.

The material may be used, incorporated in, or take the form of any of those forms mentioned above in relation to the first aspect.

In a yet further aspect, the present invention provides a method for reducing the concentration of molecular oxygen present in an atmosphere, solid, semi-solid or liquid, comprising the steps of;

(i) exposing the atmosphere, solid, semi-solid or liquid to a material according to the first or second aspect, and (ii) breaking or otherwise rendering the compartment(s) or microcapsule(s) to expose the oxidizable compound to the molecular oxygen.

Steps (i) and (ii) may be carried out in either order.

While the materials and methods according to the invention are likely to be of particular value in food packaging situations where oxygen removal is desirable, their utility is not limited thereto. Other applications include, for example, the generation of low-oxygen atmospheres in vessels for anaerobic or microaerophilic microbiology, or the generation of low-oxygen gas for blanketing flammable or oxygen-sensitive substances. Another application is the deoxygenation of microbiological media (e.g. liquid and gelled media) to ensure that the media is free from contaminating microorganisms prior to use.

Deoxygenation of microbiological media may also be used to provide anaerobic conditions to promote cell repair in heat damaged microorganisms. This is useful in assays for viable microorganisms present in cooked and canned foods (see Patel et al., Journal of Food Protection, Vol. 58 No. 3, pp 244–250:1995). In this case, it is preferred that an activated oxygen scavenger be utilised to prevent any potentially sterilising effect of generated hydrogen peroxide.

The deoxygenation of microbiological media may be carried out as follows:

The capsules are triggered in a high barrier plastic pouch as a thin layer which has been vacuum packaged. After triggering under the typical conditions described in WO 94/12590, the pouched microcapsules are transferred to the media without delay after the pouch has been opened. Incorporation of the microcapsules may be done with or without any form of stirring depending upon the need for minimising contamination of the media with airborne microorganisms and depending upon whether surface deoxygenation is most important. The microcapsules may have been sterilised prior to addition to the media by any of the methods known to those skilled in the art. Use of electromagnetic radiation, such as UV light, for this purpose might also be used for triggering.

The invention is hereinafter described by way of the following non-limiting examples.

EXAMPLE 1
Oxygen Scavenging by an Epoxy-urethane Polymer Powder, Containing Amylanthraquinone, Dispersed in a Poly(vinyl alcohol) Film An epoxy-urethane polymer powder, containing amylanthraquinone was prepared from a commercial packaging adhesive known as Novacote NC120ASL/Novacote 111B (ICI Americans Inc., Wilmington, Del. USA). A solution was prepared containing, (by weight), 23.3% Novacote NC120 ASL, 5.8% Novacote 111B, 1.8% amylanthraquinione, 16.1% polyethyleneimine (Aldrich, molecular weight of 25,000), and 53.0% ethanol. This solution was then added dropwise from a syringe with a 0.8 mm needle into a rapidly stirred solution of 2% polyethyleneimine (Aldrich, molecular weight of 25,000) in water at 70° C. After all of the solution had been added stirring was continued for a further 2 h at 70° C. After cooling the solid yellow particles were filtered off and washed with water before drying over silica gel in a vacuum dessicator.

1 g of this powder was dispersed in 20 ml of a 10% solution of poly(vinyl alcohol) (ICI Japan, T-330). This slurry was then poured into a 13.5 cm diameter glass ring on a glass plate covered with polypropylene film and heated to ~40° C. After the film had dried it was peeled from the plate. This film was then cut in half. Each half was vacuum packed into a barrier pouch (clear flat retort pouches, Conoflex Packaging, Sydney) then exposed to UV-light (320–400 nm, $\lambda_{max}$=365 nm, 220 mJ/cm$^2$/min) for 20 min per side. 15 mL of argon-free air was then introduced into each pouch. Into one of the pouches was added 5 mL of water. The headspace of the pouches was then monitored by gas chromatography. Results are shown in Table 1.

TABLE 1

Oxygen scavenging by a epoxy-urethane polymer powder, containing amylanthraquinone, dispersed in a poly(vinyl alcohol) film

| | % O$_2$ | |
|---|---|---|
| Time (h) | dry sample | wet sample |
| 0.1 | 20.5 | 20.3 |
| 20.5 | 20.5 | 18.4 |

EXAMPLE 2
Oxygen Scavenging by a Epoxy-urethane Polymer Powder, Containing Amylanthraquinone, Dispersed in a Gelatine Film 1 g of the polymer powder described in the previous example was dispersed in 20 ml of a 20% solution of gelatine. This slurry was then poured into a 13.5 cm diameter glass ring on a glass plate covered with polypropylene film and heated to ~40° C. After the film had dried it was peeled from the plate. This film was then cut in half. Each half was vacuum packed into a barrier pouch then exposed to UV-light (320–400 nm, $\lambda_{max}$=365 nm, 220 mJ/cm$^2$/min) for 20 min per side. 15 mL of argon-free air was then introduced into each pouch. Into one of the pouches was also added 5 mL of water. The headspace of the pouches was then monitored by gas chromatography. Results are shown in Table 2.

TABLE 2

Oxygen scavenging by a epoxy-urethane polymer powder, containing amylanthraquinone, dispersed in a gelatine film

| | % O$_2$ | |
|---|---|---|
| Time (h) | dry sample | wet sample |
| 0.1 | 21.8 | 20.4 |
| 19.5 | 20.3 | 17.4 |

Discussion of Examples 1 and 2

The results presented in Tables 1 and 2 clearly demonstrate that significant oxygen scavenging was achieved over the short 20 hour period of the test. The poly(vinyl alcohol) and gelatine films used in examples 1 and 2 are essentially oxygen impermeable when dry, but become oxygen permeable when exposed to elevated relative humidities or liquid water. The epoxy-urethane adhesive was used in particulate form because it was crosslinked in the presence of polyethyleneimmine (PEI) which is a known microencapsulating agent. The present inventors have found that the PEI can act as a source of labile hydrogen for photoreductive activation of the amylanthraquinone and, further, also possesses some capability to scavenge hydrogen peroxide.

EXAMPLE 3
Hydrogen Peroxide Formation in Water Exposed to Light Activated Film A strip of plastic film consisting of ethylene vinyl acetate copolymer (18% vinyl acetate) containing 2-amylanthraquinone, 5%, and polyethyleneimmine, 5%, and weighing 2.2 grams was used for this test. The film was cut into 1 cm square strips and was placed in a Quickfit test tube, 150 mm long×20 mm diameter, together with a magnetic stirring bar. The test tube was filled with cooled, boiled demineralised water and the mixture was stirred while it was illuminated with UV light under the same conditions of intensity as described in Example 1.

After 30 minutes irradiation with occasional additional stirring with a spatula the water was sampled and the sample was analysed for hydrogen peroxide using the RQ Flex photometric analysis system of Merck Ltd, (UK). The hydrogen peroxide content of the water was 5.0 ppm after 30 minutes illumination and this increased to 5.7 ppm after the water had been left in contact with the film for two hours.

Low concentrations of hydrogen peroxide such as this are well known to have strong antimicrobial effect.

EXAMPLE 4
Deoxygenation of Water by an Epoxy-urethane Polymer Powder Containing Amylanthraquinone 1 g of the polymer powder described in the previous example was mixed with 3 mL of deionised water and spread into a thin layer inside a barrier pouch. The pouch was then vacuum packed. The pouch was then exposed to UV light (320–400 nm, $\lambda_{max}$=365 nm, 220 mJ/cm$^2$/min) for 20 min per side. The pouch was then cut open and the contents added to 50 mL of oxygen saturated water. The oxygen concentration of the water was then monitored using an oxygen electrode. Results are shown in Table 3.

TABLE 3

Deoxygenation of water by an epoxy-urethane polymer powder, containing amylanthraquinone.

| Time (min) | % O$_2$ saturation |
|---|---|
| 0 | 100 |
| 4 | 6.8 |
| 10 | 2.8 |
| 15 | 0.1 |

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A can lining composition comprising oxygen-impermeable microcapsules incorporated into a polymeric lining matrix, wherein said microcapsules contain an amount of at least one compound which is oxidizable by molecular oxygen and are comprised of a hydrophilic polymer such that they are rendered oxygen-permeable upon contact with aqueous can contents; and
   wherein the at least one oxidizable compound is a compound produced from the photoreduction of an oxidized precursor compound and is oxidizable under conditions independent of both constant illumination and the presence of a transition metal catalyst; and
   wherein the polymeric lining matrix is cross-linked.

2. A composition according to claim 1, wherein the at least one oxidizable compound is selected from the group consisting of the reduced forms of quinones, photoreducible dyes and the carbonyl compounds having absorbance in the UV spectrum.

3. A composition according to claim 2, wherein the at least one oxidizable compound is a reduced form of a substituted anthraquinone.

4. A composition according to claim 3, wherein the at least one oxidizable compound is a reduced form of 2-methylanthraquinone, 2-ethylanthraquinone or 2-amylanthraquinone.

5. A composition according to claim 1, wherein the at least one oxidizable compound is present in a polymerized or oligomerized form.

6. A composition according to claim 1, wherein the at least one oxidizable compound is present as a component of a composition, said composition further comprising an activated oxygen scavenging component.

7. A composition according to claim 6, wherein the activated oxygen scavenging component is selected from organic antioxidants, organic phosphates, organic phosphines, organic phosphates, hydroquinone and substituted hydroquinone; sulfphates, sulphites, phosphates and nitrites of metals; thiodipropinoic acid and its esters and salts, thio-bis(ethylene glycol beta-aminocrotonate), cysteine, cystine and methionine; and primary, secondary and tertiary amines and their derivatives.

8. A composition according to claim 7, wherein the activated oxygen scavenging component is selected from the group consisting of triphenylphosphine, triethylphosphite, triisopropylphosphite, triphenylphosphite, tris(nonylphenyl) phosphate, tris(mono- and bis-nonylphenyl)phosphate, butylated hydroxytoluene, butylated hydroxyanisole, tris(2, 4-di-tert-butylphenyl)phosphate, dilaurylthiodipropionate, 2,2'-methylene-bis(6-t-butyl-p-cresol), tetrakis(2,4-d-tert-butylphenyl) 4,4'-biphenylene diphosphonite, poly(4-vinylpyridine) and mixtures thereof.

9. A composition according to claim 1, wherein the hydrophilic polymer is selected from polyvinyl alcohol, polyethyleneimmine, cross-linked polyvinyl alcohol, cross-linked polyethyleneimmine, cross-linked polysaccharides, and epoxy-urethane polymer.

10. A composition according to claim 1, wherein the polymeric lining matrix is an epoxy.

11. A composition according to claim 1, wherein the polymeric lining matrix is selected from polypropylene, polyester or mixtures thereof.

12. A can lined with a composition according to any one of the claims 1, 2–9, and 10 to 11.

13. A method for lining a can, said method comprising applying a composition according to any one of claims 1, 2–9 and 11 to at least a portion of said can's inner surfaces.

14. A method according to claim 13, wherein said composition is applied to all of said can's inner surface.

* * * * *